Nov. 3, 1964

C. K. SHUMWAY, JR 3,155,961

ANALOG-TO-DIGITAL CONVERTERS

Filed Aug. 28, 1962

2 Sheets-Sheet 1

Carl K. Shumway, Jr.
INVENTOR

BY Michael P. Breston

ATTORNEY

Nov. 3, 1964 C. K. SHUMWAY, JR 3,155,961
ANALOG-TO-DIGITAL CONVERTERS
Filed Aug. 28, 1962 2 Sheets-Sheet 2
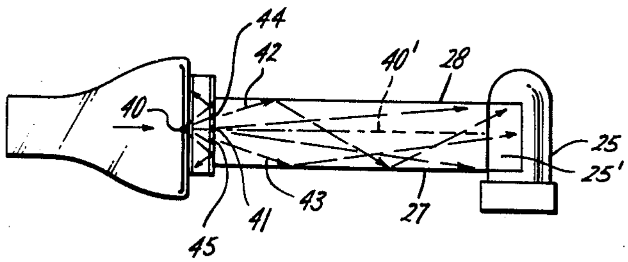
Fig. 5
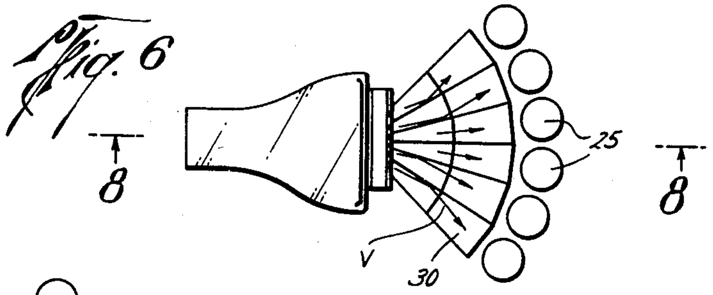
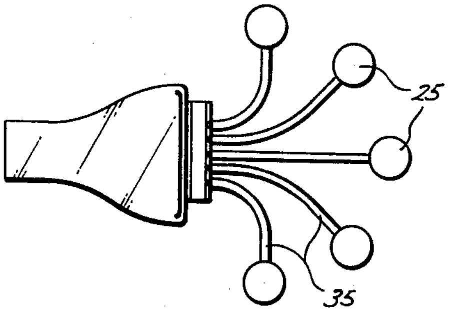
Fig. 7
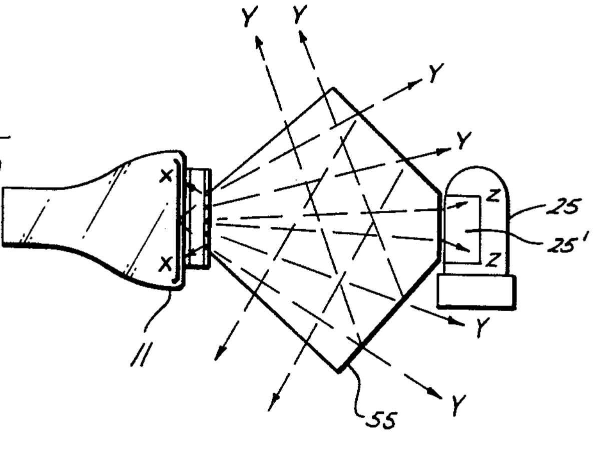
Fig. 8
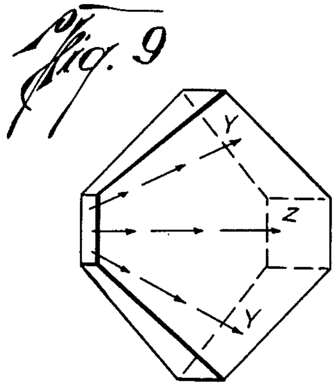
Carl K. Shumway, Jr.
INVENTOR
BY Michael P. Breston
ATTORNEY

United States Patent Office 3,155,961
Patented Nov. 3, 1964

3,155,961

ANALOG-TO-DIGITAL CONVERTERS

Carl K. Shumway, Jr., Sarasota, Fla., assignor to Electro-Mechanical Research, Inc., Sarasota, Fla., a corporation of Connecticut Filed Aug. 28, 1962, Ser. No. 219,971
1 Claim. (Cl. 340—347)

This invention relates to converters and more particularly to methods and apparatus for converting relatively high-frequency analog signals into digital signals.

In many communication systems, as in telemetry, television, etc., it is often desirable to store high-frequency analog information for future use. The information can most conveniently be stored in the memory devices of digital computers. Thence the need for fast analog-to-digital converters. While many converters have heretofore been proposed, few of them, if any, are suitable for converting relatively high-frequency signals, as radio and television signals, and especially signals having a rich harmonic content, e.g., square waves.

It is therefore an object of this invention to provide new and improved methods for converting relatively high-frequency analog signals into digital signals.

It is another object of this invention to provide new and improved methods for converting high-harmonic-content signals into digital signals.

It is a further object of this invention to provide new and improved analog-to-digital converters having a plurality of channels the cross talk between which is negligible.

It is yet another object of this invention to provide new and improved analog-to-digital converters which require no moving parts, which are relatively inexpensive to manufacture, and which occupy a relatively small volume.

The above and other apparent objects of the invention are accomplished by making the deflection of the electron beam, along a single axis in a cathode-ray tube, representative of the input analog signal so that the position of the luminescent spot at any instant corresponds to the amplitude and polarity of the analog signal, then projecting the light rays emanating from the displaced spots through a digital mask, placed on the face of the tube, onto a plurality of suitably disposed photoelectric transducers. In preferred embodiments the light rays from each column of the digital mask are directed into separate optical channels. Within each channel the axial light rays are segregated from the nonaxial light rays so that only the axial light rays can impinge upon the transducers.

The features of the invention which are believed to be novel are set forth with particularity in the appended claim. The invention itself, however, both as to its organization and mode of operation, together with further objects and advantages thereof, may best be understood by reference to the following description taken in conjunction with the accompanying drawings in which the same numerals refer to like parts and in which:

FIG. 5 is a view, in section, of single optical channel in which no off-axis signal control is provided;

FIGS. 6 and 7 show typical optical means which may be used to channel the emitted light;

FIG. 8 is a sectional view of the embodiment in FIG. 6 along line 8—8; and

FIG. 9 is an isometric view of a single prism in FIG. 6.

Figures 1, 2, 3, 4:
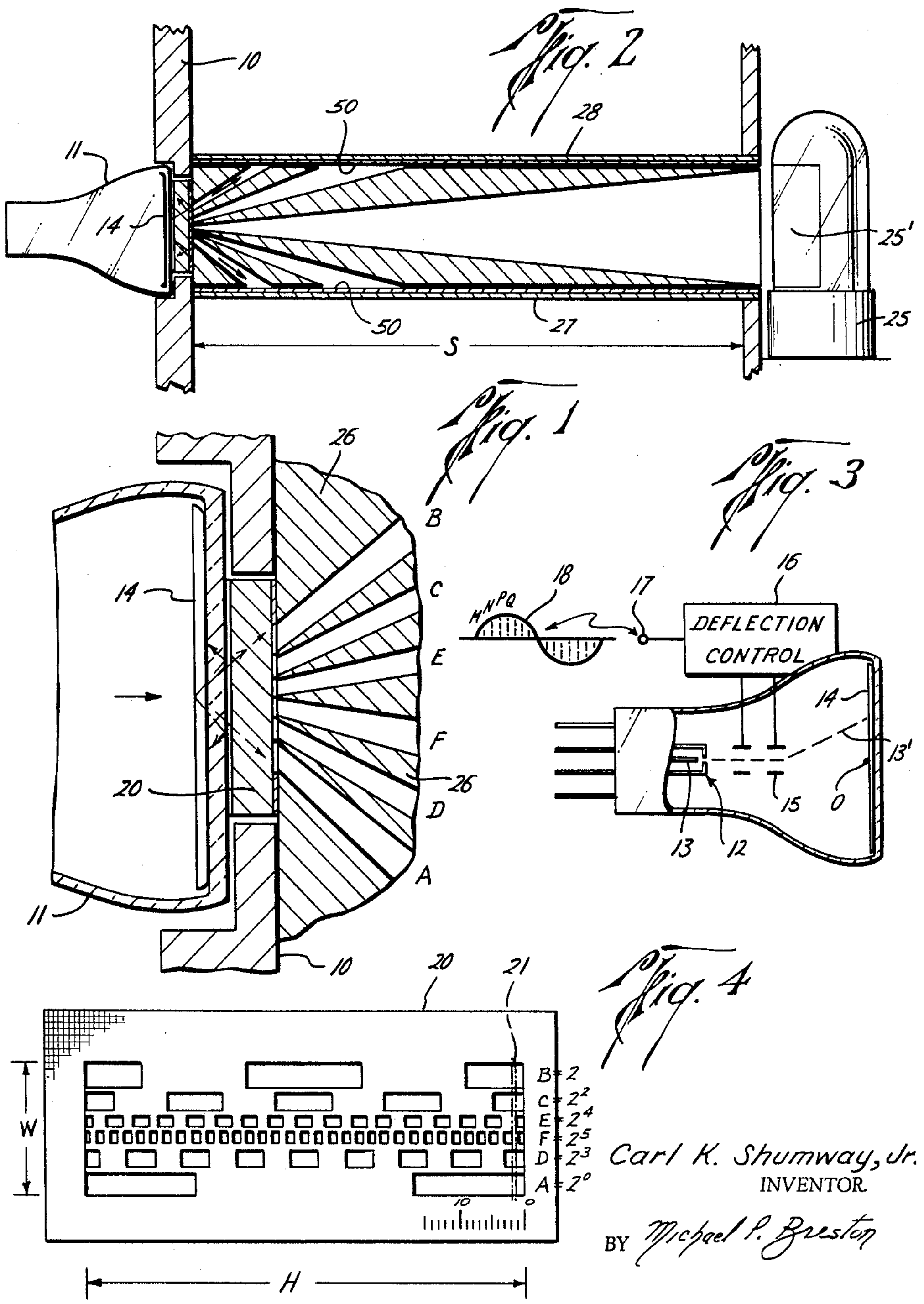
FIG. 1 is a top view, in section, of a preferred embodiment of the invention.
FIG. 2 is a side view, in elevation, of a single channel in FIG. 1.
FIG. 3 is a view, in section, of the cathode-ray tube of FIG. 1.
FIG. 4 is a plane view of a typical coded mask.

Referring now to the drawings and particularly to FIGS. 1–5, there is shown a frame 10 for supporting a monochromatic cathode-ray-oscilloscope (CRO) tube 11 having at one of its ends electron beam projecting means 12, including an electron gun 13 generating a beam of electrons 13', and at its other end a phosphor coating 14. The CRO 11 typically includes horizontal deflection plates (not shown) and vertical deflection plates 15. Typically coupled to the vertical plates 15 is a deflection-control network 16 which may include, for example, a shaping circuit and an amplifier. The deflection-control network 16 has an input terminal 17 for accepting the analog input signals to be converted into corresponding digital signals. The frequency of the incoming analog signals may range from direct current to very high frequencies corresponding, for example, to the upper radio bands. The upper limit on the frequency of the applied analog signal is primarily dependent on the luminescent properties of the phosphor coating 14 for reasons which will become apparent subsequently.

If no sweep signal is coupled to the horizontal deflection plates, then, dependent on the amplitude of the input analog signal applied to terminal 17, the electron beam 13' will deflect in a single plane along a vertical line or trace on the phosphor coating 14. Each time the electron beam impinges on the phosphor, a luminescent spot is formed. Unless the speed of the analog signal is excessively high, only one spot will correspond to a single position of the beam. A spot acts as a point light source emanating a cone of light rays. Let O be the center of the face of the CRO tube 11. Then it is apparent that at any instant of time the position of the luminescent spot relative to point O is determined by the amplitude and polarity of the applied analog signal at that instant. Consequently to encode the displacements of the luminescent spots is to encode discrete amplitude ranges of the incoming analog signal. The encoding of the spots' positions is accomplished by deriving groups of coded electric signals, each group representing a distinct portion of the vertical trace on the face of the CRO 11 and, hence, a discrete range of amplitudes of the analog signal. In FIG. 3 the analog signal 18 is represented, for example, as a sinusoidal wave; consecutive groups of digital electric signals may represent the amplitudes M, N, P, Q, . . . of signal 18. It will be apparent that from the knowledge of the discrete amplitude values of signal 18, the original signal can subsequently be reproduced, the fidelity of reproduction being a function of the number of discrete values.

A preferred manner for obtaining the desired groups of coded electric signals is to beam the cone of light emanating from each luminescent spot through a mask defining a plurality of areas having distinct transparent states arranged in groups to form a pattern in accordance with a suitable digital code. In the preferred embodiment, a binary code is employed and the areas are conveniently selected as opaque and transparent.

In FIG. 4 is shown a suitable digital mask 20. It is convenient to make mask 20 from the negative of a photo-film so that the entire surface is opaque and only the areas enclosed within the rectangles are transparent. Let H be the height and W the width of the coded pattern of mask 20. Then, dependent on the desired resolution, the height H is subdivided into a number of discrete units and the width W is divided into a number of columns. To simplify the drawing, only six columns (A–F) are shown. A greater number of columns may be employed, if desired. In general if *n* columns are provided, then the position of the luminescent spot can be ascertained to within $\frac{1}{2^n}$ of H. The first column A has a weight of $2^0$ and the last column F has a weight of $2^5$. Hence with the mask of FIG. 4 the position of the luminescent spot can be ascertained to within one thirty-second of H. The columns need not be arranged in alphabetical order. Better results are achieved if the finest column F is placed at the center of the mask and the coarsest columns A and B at its edges. This arrangement allows the strongest light signals to be directly opposite to the finest columns.

Each column includes alternate opaque and transparent areas. The areas are preferably arranged to form the well-known binary Grey code wherein two consecutive digital numbers differ only by one binary digit. For example, let a transparent area represent a binary ZERO and an opaque area a binary ONE. Then the zero position will be represented by the binary number 000000 and the first position by the binary number 001000, etc. Thus as the electron beam 13' moves along the vertical trace on the face of the CRO 11, each column transmits light signals having bright-and-dark alternations at a frequency dependent on the column's digital order.

To detect the light fluctuations, each column is associated with at least one photoelectric transducer, as with a phototube 25 suitably positioned to receive the column's light signals. Greater efficiency of light transmission is obtained by providing low-loss light-conducting channels between the coded mask 20 and the array of phototubes 25, one channel for each column.

In the preferred embodiment the channels are formed by wedges 26 disposed as shown in FIG. 1. The wedges are made of metal or plastic and their sharp edges are pressed against the digital mask along the dividing lines between the digital columns. The wedges 26 are sandwiched between a bottom cover 27 and a top cover 28, both suitably fastened to the wedges. In this manner, cross talk between channels (one phototube receiving light signals from adjacent channels) is eliminated.

Horizontal signal control or channeling can also be accomplished by using light-transmitting optical wedges or prisms 30 bundled together and end-polished as shown in FIG. 6. Instead of using wedges, the channels can be formed from optical fibers or laminates 35 bundled together and end-polished as shown in FIG. 7, each bundle being spaced adjacent and directly opposite to each column.

To allow each phototube 25 to consecutively receive the light signals from the series of transparent apertures in each column, vertical signal segregation is provided. Then the off-axis signals will be segregated from the axial signal corresponding to the luminescent spot's position on the vertical trace of the phosphor coating 14.

That vertical signal control is desirable can be appreciated from a study of FIG. 5. Assume that the luminescent spot is at position 40 in alignment with the longitudinal axis 40' of aperture 41. The luminescent spot emits a cone of light rays, at least some of which, as 42, 43, respectively pass through the adjacent, off-axis, transparent apertures 44, 45. The off-axis rays 42, 43 become reflected from the wedges' covers 27, 28. The reflected rays then impinge on the phototube 25 which generates cross-talk electric signals. Vertical signal control is accomplished in the preferred embodiment of the invention by "trapping" the off-axis rays.

In FIG. 2 is shown a vertical cross section of a typical channel depicting the manner in which the off-axis light beams are absorbed. The off-axis rays are absorbed or trapped when the bottom and top covers 27, 28 are plated or covered with a light-absorbing material 50. It will be appreciated that the spacing between the photocells 25 and the mask 20 should preferably be set so that complete vertical signal segregation is achieved in the finest digital channel F. Then vertical signal segregation will afortiori obtain in the remaining coarser channels. Vertical signal control is thus a technique for simulating lines or slices parallel to the W dimension of mask 20, as slice 21. Since the Grey code pattern can only be ambiguous in the finest column F, it is necessary that each phototube 25 have the same size "window" 25' as that of the phototube associated with channel F. The windows are carefully aligned so that when the threshold of the window in the F channel is crossed, all the thresholds of the remaining windows become simultaneously crossed. Finally because of the nature of the Grey code, the phototubes 25 are placed at a distance S from the face of the CRO tube 11 such that each of the windows 25' can see a projected aperture sustained by only one-half of the height of the aperture in the finest channel F.

Vertical signal segregation can of course be accomplished by other means than wedges. In FIG. 8, for example, it is accomplished by controlled reflection obtained by shaping each optical prism 30, as shown. FIG. 9 shows how the prism 30 also achieves horizontal channeling. In FIGS. 8 and 9 rays X represent internally reflected signals; rays Y represent segregated signals; and rays Z represent unsegregated signals reaching the window 25' of phototube 25.

In operation, the input analog signal is applied to the input terminal 17 of the deflection-control network 16. Then the luminescent spot's position relative to a reference point, as to center O, on the vertical trace is dependent upon the amplitude and polarity of the applied analog signal. The displacements of the luminescent spots along the vertical trace on the face of the CRO tube 11 will result in groups of binary ONE and ZERO signals at the output of the phototubes. By providing horizontal light channelling and vertical light segregation, cross talk between the channels and within each channel is substantially eliminated. Moreover because the electron beam 13' substantially instantaneously responds to variations in the frequency of the incoming analog signal, analog-to-digital conversion of variable frequency signals and of signals with rich harmonic contents can be readily achieved by employing the teachings of this invention.

While preferred methods and embodiments have been disclosed, it will be understood by one skilled in the art that modifications may be made therein without departing from the principles of the present invention, and said invention is to be limited only by the claim appended hereto.

What is claimed is:

A system for converting analog-to-digital signals comprising in combination:

a cathode-ray-tube having an end face defining a light emitting surface, means for generating an electron beam, means for displacing said electron beam over said light emitting surface, the displacement being a function of the amplitude of said analog signals; a thin coded mask disposed adjacent and opposite to said light emitting surface and in the path of light emitted by said surface, said mask being formed of a plurality of areas, said areas having distinct transparent states and being arranged in groups to form the columns of a digital pattern, each group being representative of a discrete position of said beam; a plurality of photoelectric transducers, at least one transducer for each column; a housing having a light absorbing floor, a light absorbing ceiling, and a plurality of wedges between said floor and said ceiling, one wedge for each column, each wedge defining a sharp edge which is pressed against the digital mask along a line dividing two consecutive digital columns for projecting the light transmitted by each group of areas onto selected ones of said transducers thereby providing groups of corresponding electric signals, each group of electric signals being representative of a discrete amplitude of said analog signals.

References Cited in the file of this patent

UNITED STATES PATENTS

| | | |
|---|---|---|
| 2,830,285 | Davis et al. | Apr. 8, 1958 |
| 2,834,005 | Ketchledge | May 6, 1958 |
| 2,855,539 | Hoover | Oct. 7, 1958 |

OTHER REFERENCES

IBM Technical Disclosure Bulletin, vol. 4, No. 7, December 1961, p. 85.